Patented Oct. 19, 1948

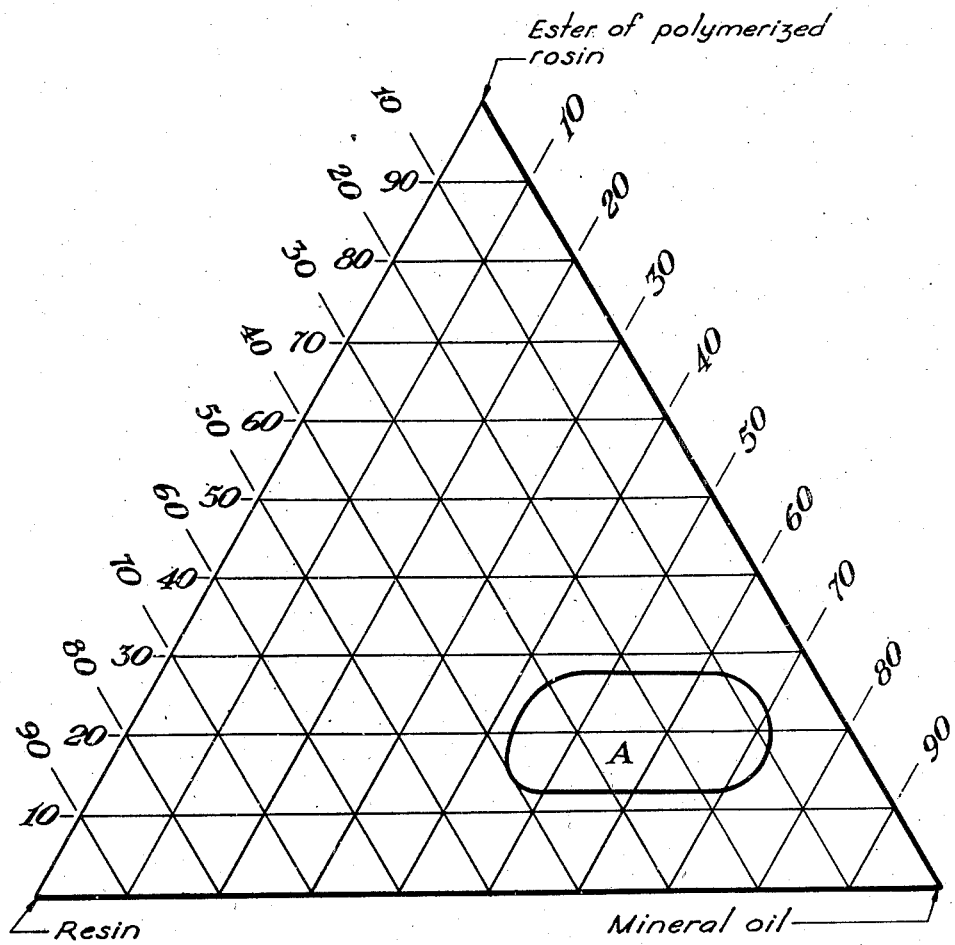
Composition = 20% Ethyl cellulose; 80% "A"

2,451,792

UNITED STATES PATENT OFFICE 2,451,792

HOT-MELT COATING COMPOSITION

Arthur E. Young and Kenneth D. Bacon, Midland, Mich., assignors to The Dow Chemical Company, Midland, Mich., a corporation of Michigan Application November 9, 1945, Serial No. 627,749

2 Claims. (Cl. 260—16)

This invention relates to a composition of matter for use primarily as a coating composition and is especially concerned with such a coating which is applied from the molten condition. Compositions of this type have become known as "hot-melts" and the latter term will be employed herein in connection with the present composition. The invention relates in particular to a wax-free hot-melt coating composition having good heat-sealing characteristics and being capable of use in connection with food packages.

Most of the hot-melt coatings heretofore known have contained a mineral wax or an ester wax, or both, as essential ingredients. For many purposes these predominantly waxy compositions have been perfectly satisfactory. Some of the waxes commonly used in waxy melts have objectionable odors, even at low temperatures. A few hot-melt compositions are known which do not contain wax, but most of these are objectionable from the standpoint of color or odor or moisture vapor transmission, and because of their defects cannot be used satisfactorily in connection with food packaging operations. Because of the weak seal formed between two sheets of waxed (paraffin coated) paper such as is commonly used for food packaging, an end-sealing label coated with a heat-sealing wax-free melt is desirable to provide a stronger bond than is possible with the paraffin coating alone.

It is an object of the present invention to provide a wax-free hot-melt coating composition satisfactory for use in food packaging operations and having a suitably low viscosity at the normal temperatures of application to permit easy distribution of the material over the paper surface being coated. A related object is to provide such a composition which will form the desirably perfect heat-seal on food packages when applied with the standard sealing apparatus. A particular object is to provide a wax-free hot-melt coating composition which can be applied to the end labels of bread wrappers and which will adhere and form a perfect seal with any of the usual bread wrapping sheets, whether these sheets are "wax paper" (paraffin coated), plain paper, or regenerated cellulose. A related object is the provision of a composition of the type mentioned above which is free from odors which would be objectionable in the food industry. Other and related objects may become apparent from the following description.

We have now discovered a new and useful wax-free hot-melt coating composition composed essentially of about 20 parts by weight of ethyl cellulose and about 80 parts by weight of a mixture of a refined mineral oil, a particular type of polymerized rosin ester and a particular type of maleic anhydride modified ester gum. The proportions and particular specifications of the various essential ingredients will be described more fully hereinafter. During the course of the description, reference will be had to the accompanying drawing wherein is represented the preferred range of proportions of the oil, the rosin ester, and the resin.

The ethyl cellulose employed in the present composition is that standard product having an ethoxyl content in the range from about 47.5 to about 50 per cent. It should be a low viscosity material and for the present purposes is preferably one whose 5 per cent solution by weight in a mixture of 80 parts of toluene and 20 parts of ethanol has a viscosity of less than 30 centipoises. In the specific composition here claimed, the amount of ethyl cellulose is about 20 per cent by weight. This proportion may be varied slightly in the range from about 18 to about 22 per cent.

The mineral oil employed in the present composition is a refined oil, suitably of light color or water-white and possibly of pharmaceutical grade or equivalent. The oil may be of paraffinic character or it may be one which is derived from a naphthenic petroleum source. Examples of suitable oils not of pharmaceutical quality are those supplied under the trade-names "Necton" and "Thermol Heavy." The oils which have been most satisfactory are those having a viscosity in the range from about 40 to about 100 Salbolt units at 210° F. In the ternary mixture of mineral oil, rosin ester and resin which comprises about 80 per cent of the present composition, the amount of mineral oil employed may range from as little as 42.5 per cent to as much as 72.5 per cent.

The type of polymerized rosin ester employed in the present compositions is commercially available under the designation "Polypale Esters." These are understood to be esters of polymerized rosin with polyhydric alcohols and are identified commercially in the following manner. Polypale Ester No. 1 is the ethylene glycol ester of polymerized rosin; Polypale Ester No. 2 is the diethylene glycol ester of polymerized rosin; and Polypale Ester No. 3 is the triethylene glycol ester of polymerized rosin. Each of these products is useful in the present composition, but the most advantageous one of the series is Polypale Ester No. 2. In the ternary mixture of mineral oil, polymerized rosin ester and resin which constitutes about 80 per cent of the present composition, the amount of Polypale Ester may vary from as little as 12.5 per cent to as much as 27.5 per cent, by weight.

The resinous ingredient of the present composition is a maleic anhydride-modified ester gum having a softening temperature, as measured on the melting point bar, of about 88° to about 92° C. and a melting point of about 115° to 120° C. An example of such a product which is commercially available is that known as "Amberol 800" supplied by The Resinous Products and Chemical Company. The amount of Amberol 800 or equivalent resin employed in the ternary mixture of mineral oil, rosin ester and resin which comprises about 80 per cent of the present composition may range from as little as 7.5 per cent to as much as 40 per cent.

The particular proportions of the mineral oil, the ester of polymerized rosin, and the maleic anhydride-modified ester gum which are to be employed satisfactorily in the present composition are those represented by the area on the accompanying drawing designated as area A. Compositions consisting of from 18 to 22 per cent of ethyl cellulose, the balance being any composition represented by area A of the accompanying drawing, are hot-melt compositions which form excellent seals when applied to plain paper, waxed paper, or regenerated cellulose. All of the compositions represented by the present invention, when applied as melts to paper, will form seals at temperatures below 350° F. The coated paper will not block under pressures of 1 pound per square inch at 120° F. The present compositions may be maintained in the molten condition in the storage reservoirs of the coating apparatus as much as 24 hours without degradation or significant change in properties. This is a very difficult test for any composition to meet, and its satisfaction by the present composition testifies to their superiority.

In attempting to arrive at the present composition and to provide a hot-melt having the desired properties which could be produced at a moderate and suitable price, a large number of compositions was prepared and tested, each of which had several objectionable features, unless the compositions fell within the range recited in the accompanying claims. Thus, compositions containing higher proportions of mineral oil than are represented by area A on the accompanying drawing had a tendency to separate into two liquid layers when heated for prolonged periods at the coating temperature. Compositions with a lesser amount of mineral oil than that represented by area A in the drawing are too brittle. Any tendency toward brittleness in compositions at the extreme left-hand end of area A may be overcome by the addition of as little as 3 per cent or less of a soft, non-setting castor oil-modified alkyd resin, such as that known as "Beckosol 24" (manufactured by Reichhold Chemicals, Inc.). Compositions containing derivatives of rosin other than the Polypale Esters and those containing resinous ingredients other than the maleic anhydride-modified ester gums, previously defined, suffer from various disadvantages with respect to viscosity, melting point, odor, blocking characteristics, and cost. When most of these disadvantages were eliminated by variations in the composition, it often happened that the product failed to provide the required adhesion between sheets of coated paper.

The compositions of the present invention, when made using Polypale Ester No. 2, and when first prepared, have a viscosity at 150° C. of about 8400 centipoises and a viscosity at 140° C. of about 14,000 centipoises. After they have been heated for 24 hours at 150° C. the present compositions have a viscosity of about 11,800 centipoises at that temperature. The new compositions have been applied to paper which was to be used as end labels for sealing waxed paper food cartons and bread wrappers. When so employed, it has been found that the sealing operation may be quickly effected at temperatures in the range from 250° to 300° F., and the seal is much stronger than any of the usual bonds between wax-saturated coatings.

We claim:

1. A wax-free hot-melt coating composition consisting essentially of from 18 to 22 per cent by weight of an ethyl cellulose having an ethoxyl content of from 47.5 to 50 per cent and a viscosity less than 30 centipoises, as determined in a 5 per cent solution thereof, by weight, in an 80:20 mixture, by volume, of toluene and ethanol, the balance of the composition, correspondingly from 82 to 78 per cent of the whole, being a ternary mixture of: at least 42.5 per cent and not over 72.5 per cent of a refined pale mineral oil having a viscosity of 40 to 100 Saybolt units at 210° F.; at least 12.5 per cent and not over 27.5 per cent of an ester of polymerized rosin with a polyhydric alcohol from the group consisting of ethylene glycol, diethylene glycol, and triethylene glycol; and, at least 7.5 per cent and not over 40 per cent of a maleic anhydride-modified ester gum having a melting point in the range from 115° to 120° C., the proportions of the oil, rosin ester and modified ester gum in said ternary composition being defined by any point falling within the area A on the accompanying drawing.

2. A wax-free hot-melt coating composition consisting essentially of from 18 to 22 per cent by weight of an ethyl cellulose having an ethoxyl content of from 47.5 to 50 per cent and a viscosity less than 30 centipoises, as determined in a 5 per cent solution thereof, by weight, in an 80:20 mixture, by volume, of toluene and ethanol, the balance of the composition, correspondingly from 82 to 78 per cent of the whole, being a ternary mixture of: at least 42.5 per cent and not over 72.5 per cent of a refined pale mineral oil having a viscosity of 40 to 100 Saybolt units at 210° F.; at least 12.5 per cent and not over 27.5 per cent of a diethylene glycol ester of polymerized rosin; and, at least 7.5 per cent and not over 40 per cent of a maleic anhydride-modified ester gum having a melting point in the range from 115° to 120° C., the proportions of the oil, rosin ester and modified ester gum in said ternary composition being defined by any point falling within area A on the accompanying drawing.

ARTHUR E. YOUNG.
KENNETH D. BACON.

REFERENCES CITED

The following references are of record in the file of this patent:

UNITED STATES PATENTS

| Number | Name | Date |
|---|---|---|
| 2,326,810 | Wiggam | Aug. 17, 1943 |
| 2,359,874 | Rummelsburg | Oct. 10, 1944 |

Certificate of Correction

Patent No. 2,451,792.  October 19, 1948.

ARTHUR E. YOUNG ET AL.

It is hereby certified that errors appear in the above numbered patent requiring correction as follows:

In the grant, line 3, and in the heading to the printed specification, lines 5 and 6, State of incorporation, for "Michigan" read *Delaware*;

and that the said Letters Patent should be read with these corrections therein that the same may conform to the record of the case in the Patent Office.

Signed and sealed this 24th day of May, A. D. 1949.

[SEAL]

THOMAS F. MURPHY,
*Assistant Commissioner of Patents.*